(12) United States Patent
Yamamoto et al.

(10) Patent No.: US 6,457,703 B1
(45) Date of Patent: Oct. 1, 2002

(54) ENGINE MOUNT

(75) Inventors: Kentaro Yamamoto, Osaka (JP); Hironori Kato, Osaka (JP); Tsuyoshi Inada, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/924,466

(22) Filed: Aug. 9, 2001

(30) Foreign Application Priority Data

Mar. 2, 2001 (JP) ........................................ 2001-058756

(51) Int. Cl.[7] ............................. F16F 13/16; B60K 5/12
(52) U.S. Cl. ................................................. 267/140.11
(58) Field of Search ........................... 267/140.11–141.7

(56) References Cited

U.S. PATENT DOCUMENTS

| 5,139,240 A | * | 8/1992 | Miyamoto et al. ..... 267/140.13 |
| 5,645,138 A | * | 7/1997 | Tajima et al. ................ 180/300 |
| 5,988,611 A | * | 11/1999 | Takashima et al. ..... 267/140.13 |
| 6,032,935 A | * | 3/2000 | Mizutani et al. ........ 267/140.11 |
| 6,158,724 A | * | 12/2000 | Takashima et al. ..... 267/140.13 |
| 6,170,811 B1 | * | 1/2001 | Yotani et al. .......... 267/140.13 |

* cited by examiner

*Primary Examiner*—Christopher P. Schwartz
(74) *Attorney, Agent, or Firm*—Wenderoth, Lind & Ponack, L.L.P.

(57) ABSTRACT

An engine mount having a vibration isolating base body formed of a rubber elastic body interposed between a body side metal fitting and an engine side metal fitting. A stopper mechanism which absorbs an excessive displacement of an engine mount is provided. The stopper mechanism is constituted of a cylindrical metal fitting provided at the body side metal fitting and a stopper rubber portion provided at the engine side metal fitting opposed to the cylindrical metal fitting. The stopper rubber portion is constituted of an outer peripheral flange protruding radially outwardly from the engine side metal fitting, a coating rubber layer covering the outer peripheral flange and a reinforcing metal fitting of a L-shape cross section embedded in the coating rubber layer.

7 Claims, 3 Drawing Sheets

ENGINE MOUNT

BACKGROUND OF THE INVENTION

The present invention relates to an engine mount used for supporting an automobile engine and the like on a vehicle body.

In general, when an automobile engine and the like is installed on a vehicle body, engine mounts are interposed therebetween in order to control vibration transmission from an engine to a vehicle body. One prior art example of an engine mount is shown in FIG. 3. The engine mount comprises a body side metal fitting 101 fixed to a vehicle body, an engine side metal fitting 102 fixed to an engine, a vibration isolating base body 103 formed of a rubber elastic body interposed between both of the metal fittings 101 and 102, and a liquid chamber 107 partitioned into a main chamber 105 and an auxiliary chamber 106 by a partition member 104, whereby the vibration damping function and the vibration isolating function are achieved by the operation of the vibration isolating base body 103 and a liquid flow effect through an orifice 108 provided at the partition member.

Further, a stopper mechanism 109 is provided in order to prevent a large displacement of the engine mount caused by vibration of an engine and the like. Namely, an outer peripheral flange 110 of the engine side metal fitting 102 is covered by a coating rubber layer 111 so as to form a stopper rubber portion 112. The cylindrical body side metal fitting 101 is provided with a cylindrical portion 113 extending to the engine side so as to oppose the stopper rubber portion 112 and with an inner peripheral flange 114 formed radially inwardly from the cylindrical portion 113. By maintaining a given clearance between both of the above mentioned cylindrical portion 113 and the inner peripheral flange 114 and the stopper rubber portion 112, an excessive displacement of the engine mount, which occurs for example during the vehicle running on a bad road, is absorbed.

In the above stopper mechanism, however, the coating rubber layer of the stopper rubber portion is made of a comparatively soft rubber elastic composition. Accordingly, in case where continuously repeated vibration is exerted on the stopper mechanism during the vehicle running on a bad road for a long period, the stress is likely to concentrate on a boundary portion between the soft coating rubber layer and the outer peripheral flange covered thereby, which results in the occurrence of cracks of the coating rubber layer.

In order to solve the above problem, it may be proposed to enhance the rigidity of the coating rubber layer by increasing a spring constant of the coating rubber layer. However, in view of the fact that the coating rubber layer is formed integrally with the vibration isolating base body, such solution affects the spring constant of the vibration isolating base body, namely, the properties of the engine mount. Alternatively, a different component having a high rigidity may be applied in place of the coating rubber layer. However, such alternate component leads to increasing of material costs and production costs.

SUMMARY OF THE INVENTION

In view of the above, it is an object of the present invention to provide an engine mount wherein the durability of the stopper rubber portion is improved without affecting the spring properties of the vibration isolating base body.

It is another object of the present invention to provide an engine mount having a low-cost stopper rubber portion having high durability.

The inventors have made various studies with respect to an engine mount which can improve durability of the stopper rubber portion without affecting the spring properties of the vibration isolating base body and as a result, it has been found that a low-cost stopper rubber portion having a high rigidity can be obtained without affecting the spring properties of the vibration isolating base body provided that a reinforcing metal fitting is embedded in the coating rubber layer to enhance the rigidity thereof.

According to the present invention, a stopper mechanism which absorbs an excessive displacement of an engine mount comprises a cylindrical metal fitting provided at a body side metal fitting surrounding a engine side metal fitting and a stopper rubber portion protruding from the engine side metal fitting so as to oppose to said cylindrical metal fitting. The stopper rubber portion is comprised of an outer peripheral flange protruding radially outwardly from the engine side metal fitting, a coating rubber layer covering said outer peripheral flange, and a reinforcing metal fitting embedded in said coating rubber layer.

Namely, the present invention provides an engine mount having a vibration isolating base body formed of a rubber elastic body interposed between a body side metal fitting and an engine side metal fitting. The body side metal fitting is provided with a cylindrical metal fitting surrounding an engine side metal fitting. The engine side metal fitting is provided with a stopper rubber portion opposed to the cylindrical metal fitting. The stopper rubber portion comprises an outer peripheral flange protruding radially outwardly from the engine side metal fitting, a coating rubber layer covering the outer peripheral flange and a reinforcing metal fitting embedded in the coating rubber layer.

Such reinforcing metal fitting may be embedded in the coating rubber layer in an integral molding process of the coating rubber layer and the vibration isolating base body without taking a separate molding process, and so the production costs bear comparison with the case of manufacturing an engine mount having no such reinforcing metal fitting. The material cost of the reinforcing metal fitting is cheaper as compared with a different component having a high rigidity to be applied in place of the coating rubber layer.

The reinforcing metal fitting may be embedded in any position of the coating rubber layer in order to increase the rigidity of the coating rubber layer. For example, the reinforcing metal fitting may be embedded at a position where vibration is repeatedly received, that is, a position opposed to an inner peripheral face of the cylindrical metal fitting or a position opposed to an inner peripheral flange formed radially inwardly from the cylindrical metal fitting. Preferably, the reinforcing metal fitting is embedded in both of the above mentioned positions, namely, the position opposed to an inner peripheral face of the cylindrical metal fitting and the position opposed to an inner peripheral flange.

Accordingly, the present invention also provides an engine mount comprising a body side metal fitting, an engine side metal fitting and a vibration absorbing base body formed of a rubber elastic body interposed therebetween, a cylindrical metal fitting provided at the body side metal fitting surrounding the engine side metal fitting, an inner peripheral flange extending radially inwardly from the cylindrical metal fitting, a stopper rubber portion protruding from the engine side metal fitting opposed to both the cylindrical metal fitting and the inner peripheral flange, the stopper rubber portion comprises an outer peripheral flange extending radially outwardly from the engine side metal fitting, a coating rubber layer covering the outer peripheral flange and a reinforcing metal fitting embedded in the coating rubber layer, the reinforcing metal fitting being embedded in both a position opposed to the inner peripheral face of the cylindrical metal fitting and a position opposed to the inner peripheral flange respectively.

The reinforcing metal fittings embedded in both positions may be formed as a single unit. Namely, a reinforcing metal fitting may be formed in a L-shape cross section having a radial reinforcing portion opposed to the inner peripheral face of the cylindrical metal fitting and an axial reinforcing portion opposed to the inner peripheral flange. Such reinforcing metal fitting is easily embedded, during a vulcanization-molding process of the coating rubber layer, the comer portion of the L-shape reinforcing metal fitting prevents stress concentration at an outer peripheral edge portion of the outer peripheral flange, so that the rigidity of the stopper rubber portion is well enhanced.

The reinforcing metal fitting is preferred to be disposed in a ring-like configuration all round the stopper rubber portion. Alternatively, however, a reinforcing metal fitting may be disposed only at a position where vibration is repeatedly received, or a plurality of reinforcing metal fittings may be disposed discontinuously all round the stopper rubber portion.

The above mentioned stopper mechanism is applicable to both an engine mount having no liquid chamber and a liquid filled engine mount having a liquid chamber comprising a main liquid chamber and an auxiliary liquid chamber. When applied to a liquid filled engine mount, the functionality and durability of the stopper rubber portion can be improved without affecting the properties of the vibration isolating base body which actuates a filled liquid by piston action.

As mentioned above, in the engine mount in accordance with the present invention, a low-cost stopper rubber portion of high rigidity is obtained by embedding the reinforcing metal fitting in the stopper rubber portion without affecting the properties of the engine mount. Even when continuously repeated vibration is exerted on the stopper mechanism during the vehicle running on a bad road for a long period, no failure occurs on the stopper rubber portion and the durability is improved.

DETAILED DESCRIPTION OF THE PREFERRED EMBODIMENTS

Preferred embodiments of the present invention will be explained in detail below with reference to the accompanying drawings.

Figure 1:
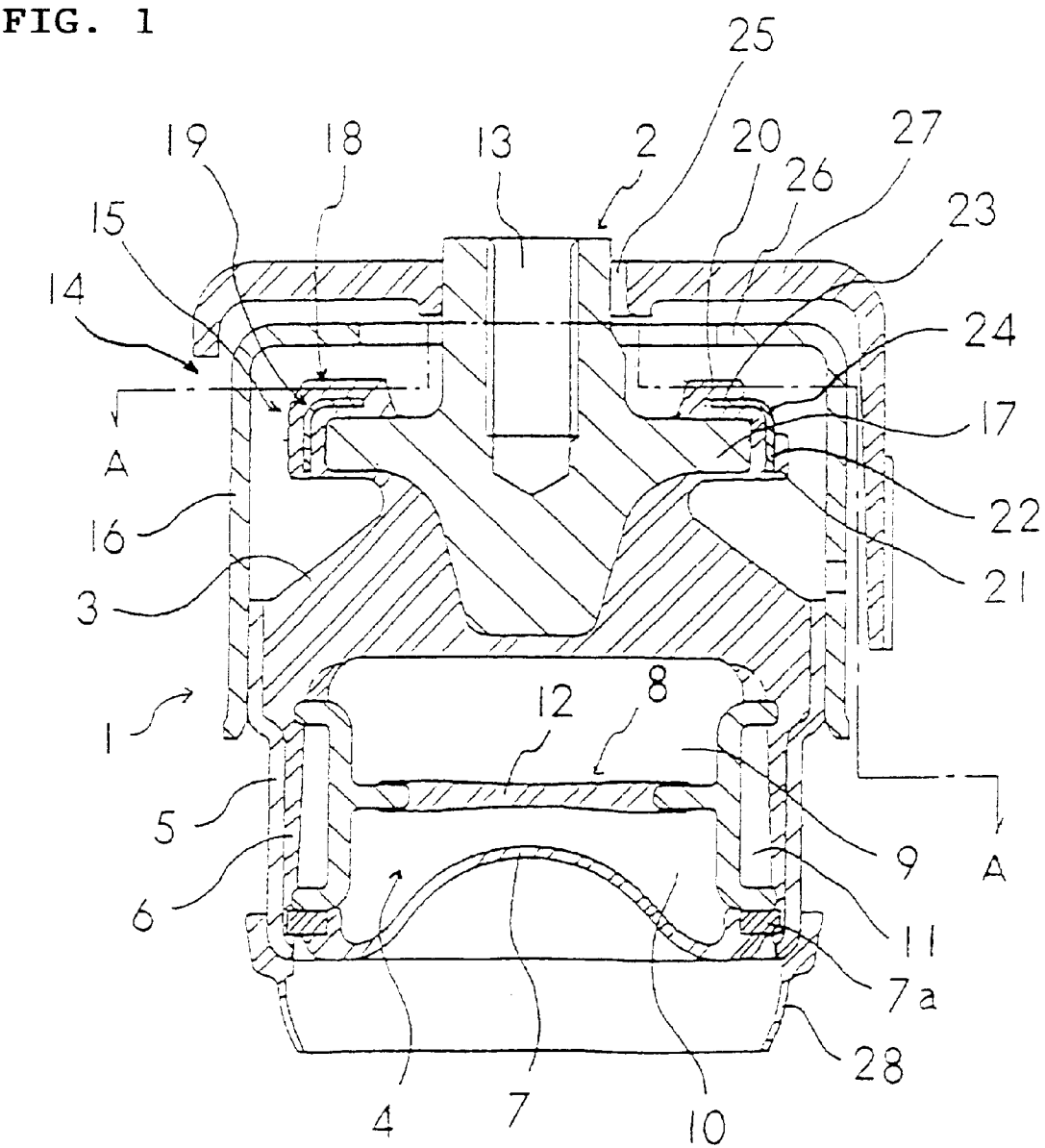
FIG. 1 is a longitudinal sectional view of an engine mount according to the present invention.
Figure 2:
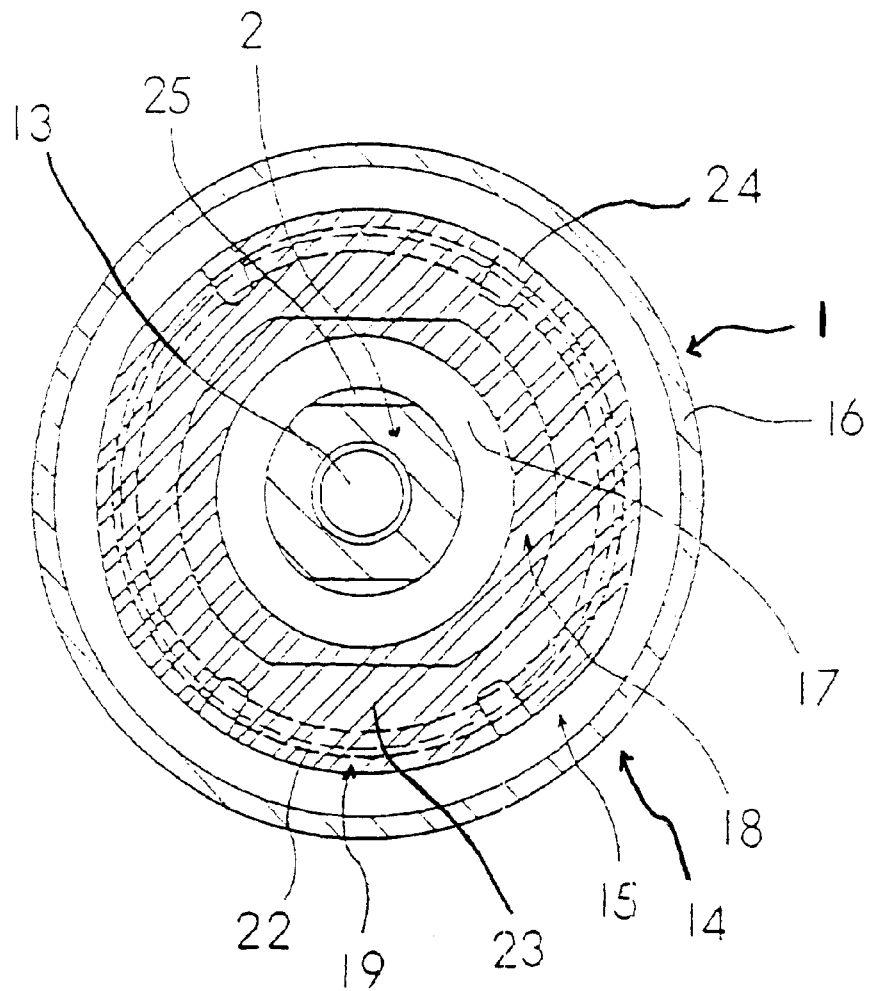
FIG. 2 is a sectional view taken along the line A—A of FIG. 1.
Figure 3:
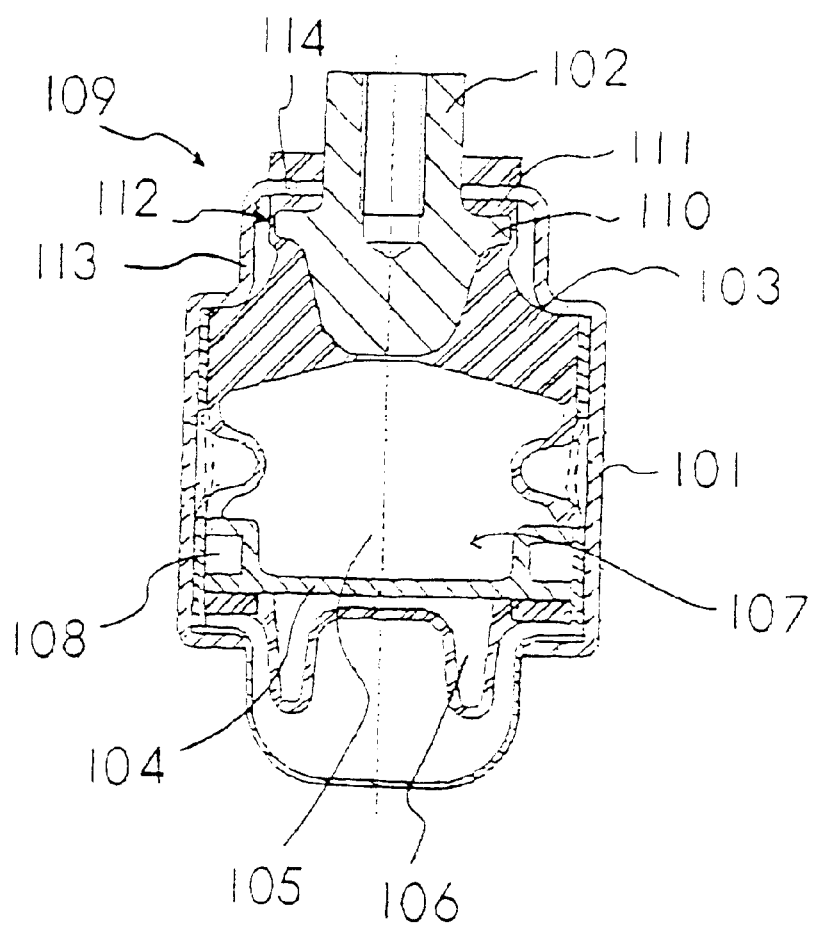
FIG. 3 is a longitudinal sectional view of a conventional engine mount.

The engine mount shown in FIG. 1 and FIG. 2 comprises a body side metal fitting 1 mounted on a vehicle body, an engine side metal fitting 2 mounted on an engine, a vibration isolating base body 3 formed of a rubber elastic body interposed between the body side metal fitting 1 and the engine side metal fitting 2, and a liquid filled chamber 4.

The body side metal fitting 1 is constituted of a metal cylinder 5 and a cylindrical metal fitting 16. The vibration isolating base body 3 and a rubber layer 6 continuously formed of the lower end portion of the vibration isolating base body are bonded to the inner peripheral face of the metal cylinder 5 by vulcanization adhesion. A lower opening end portion of the metal cylinder 5 and the vibration isolating base body 3 is sealed with a diaphragm 7, and a liquid chamber 4 is formed by a space surrounded by the vibration isolating base body 3, the diaphragm 7 and the metal cylinder 5. The liquid chamber 4 is partitioned into an upper main liquid chamber 9 and a lower auxiliary liquid chamber 10 by a partition member 8 provided in the liquid chamber in a pressed condition against the rubber layer 6, and the two liquid chambers 9 and 10 are communicated with each other by an orifice 11 provided at the outer periphery of the partition member 8. Consequently, a low frequency vibration is damped by the liquid flow effect through the orifice 11 actuated by piston action of the vibration isolating base body 3 at the time when a vibration is exerted. A rubber membrane 12 is provided at a central portion of the partition member 8 by vulcanization adhesion, and the rubber membrane absorbs a high frequency vibration which can not be absorbed by the liquid flow effect through the orifice 11.

The partition member 8 and the diaphragm 7 are disposed at the body side metal fitting 1 in such a manner that they are inserted into the metal cylinder 5 and thereafter the metal cylinder 5 is reduced in size in the radial direction to fix a ring-like metal fitting 7a of the diaphragm 7 not so as to drop out of the metal cylinder. The body side metal fitting 1 is fixed to a frame and the like of the vehicle body using a mounting metal fitting, not illustrated, welded to the cylindrical metal fitting 16. The engine side metal fitting 2 made of a bar-like metal member positioned at the center portion of the body side metal fitting 1 is provided with a bolt hole 13 at the axially upper end for fastening thereto a mounting bolt of an engine and provided with the vibration isolating base body 3 at the lower end formed integrally by vulcanization adhesion.

The vibration isolating base body 3 is of substantially a conical shape integrally formed in a vulcanization molding with the inner peripheral face of the upper portion of the metal cylinder 5 of the body side metal fitting 1 and the lower end portion of the engine side metal fitting 2, and performs the vibration damping function and the pistion action function for actuating the flow of the liquid filled in the liquid chambers.

At the upper portion of the engine side metal fitting 2, a stopper mechanism 14 which absorbs an excessive displacement of an engine mount is provided. The stopper mechanism 14 is constituted of a stopper rubber portion 15 projecting radially outwardly from the engine side metal fitting 2, and the cylindrical metal fitting 16 of the engine side metal fitting 1 surrounds the stopper rubber portion 15. The stopper rubber portion 15 is constituted of an outer peripheral flange 17 projecting radially outwardly from the engine side metal fitting 2, a coating rubber layer 18 covering said outer peripheral flange 17, and a reinforcing metal fitting 19 embedded in said coating rubber layer 18.

The coating rubber layer 18 is formed integrally with the rubber elastic body constituting the vibration isolating base body 3. For obtaining an effective stopper function, a thick rubber layers 20 and 21 are formed respectively at the upper periphery and the radially outward periphery of the outer peripheral flange 17.

The reinforcing metal fitting 19 is made of a metal plate formed in a ring-like shape surrounding the outer peripheral flange 17, and constituted of a radial reinforcing portion 22 positioned radially outwardly from the outer peripheral flange 17 and an axial reinforcing portion 23 positioned axially outwardly from the outer peripheral flange 17. The reinforcing portions are formed as a single unit in a L-shape cross section to form the reinforcing metal fitting of an inverted cup shape. Each of the reinforcing portions 22 and 23 is embedded in the center portion of the coating rubber layer 18.

At plural positions, four positions in this embodiment, of the outer periphery of the coating rubber layer 18 in which the reinforcing metal fitting 19 is embedded therein, an aperture 24 is provided to expose a corner portion of the reinforcing metal fitting 19 outside of the coating rubber layer 18, so that the reinforcing metal fitting 19 is held at the exposed corner portions in the vulcanizing mold process of the coating rubber layer 18 and the reinforcing metal fitting 19 embedded therein.

The cylindrical metal fitting 16 is formed in an inverted cup shape by bending the upper portion radially inwardly to form an inner peripheral flange 26 opposed to the upper portion of the stopper rubber portion 15 and provided with an opening 25 at the center portion thereof which permits a radial movement of the engine side metal fitting 2 of a bar-like member. The lower opening of the cylindrical metal fitting 16 is press-fitted and fixed to the outer periphery of the metal cylinder 5 to form the engine side metal fitting 1. The cylindrical metal fitting 16 may be formed integrally with the metal cylinder 5 so as to form the body side metal fitting 1.

At the upper end portion of the engine side metal fitting 2, a stopper and covering member 27 is provided, so that a large displacement in the downward direction of the engine side metal fitting 2 is suppressed with the elastic contact of the stopper member with the inner flange 26 of the cylindrical metal fitting 16. At the outer periphery of the lower end portion of the body side metal fitting 1, a dust cover 28 having substantially a cylindrical shape is provided.

In the above mentioned constitution, in case either the body side metal fitting 1 or the engine side metal fitting 2 is displaced excessively during the vehicle running on a bad road, the stopper rubber portion 15 is brought into contact elastically with the inner periphery of the cylindrical metal fitting 16 or with the inner peripheral flange 26 so as to suppress further deflective deformation.

Since the reinforcing metal fitting 19 comprising the axial reinforcing portion 23 and the radial reinforcing portion 22 is embedded in the coating rubber layer 18 of the stopper rubber portion 15, the rigidity of the coating rubber layer 18 is high enough to suppress the deflective deformation without causing the destruction of the coating rubber layer, even when the engine mount is subjected to a repeated load or vibration exerted in the axial direction or in the radial direction. Accordingly, the vibration isolating base body 3 made of rubber elastic body maintains the necessary spring properties and is improved in functionality and durability.

It should be understood that the foregoing description is only illustrative of the invention. Various alternatives and modifications can be devised by those skilled in the art without departing from the invention. For example, the cylindrical metal fitting of an inverted cup shape may be formed in a simple cylindrical shape without forming the inner peripheral flange and the reinforcing metal fitting embedded in the stopper rubber portion may be constituted only of a radial reinforcing portion, when the axial displacement seldom occurs.

What is claimed is:

1. An engine mount comprising:
   an engine side metal fitting;
   a body side metal fitting including a cylindrical metal fitting surrounding said engine side metal fitting;
   a vibration isolating base formed of an elastic rubber body interposed between said body side metal fitting and said engine side metal fitting; and
   a stopper provided on said engine side metal fitting and opposing said cylindrical metal fitting,
   said stopper portion comprising an outwardly extending radial flange that extends radially outwardly from said engine side metal fitting, a rubber layer covering said outwardly extending radial flange, and a reinforcing metal fitting embedded in said rubber layer, wherein said reinforcing metal fitting is interposed between opposing axial surfaces of said cylindrical metal fitting and said outwardly extending radial flange and between opposing radial surfaces of said cylindrical metal fitting and said outwardly extending radial flange.

2. An engine mount as claimed in claim 1, further comprising a liquid chamber defining a main liquid chamber and an auxiliary liquid chamber.

3. An engine mount comprising:
   an engine side metal fitting;
   a body side metal fitting including a cylindrical metal portion surrounding said engine side metal fitting, said cylindrical metal portion having an inwardly extending radial flange;
   a vibration isolating member comprising an elastic rubber body interposed between said body side metal fitting and said engine side metal fitting;
   a stopper protruding from said engine side metal fitting, said stopper comprising an outwardly extending radial flange extending radially outwardly from said engine side metal fitting, a rubber layer covering said outwardly extending radial flange, and a reinforcing metal fitting embedded in said rubber layer,
   said reinforcing metal fitting being embedded in a portion of said rubber layer that is opposed to an inner peripheral surface of said cylindrical metal fitting and in a portion of said rubber layer that is opposed to an inner peripheral surface of said inwardly extending radial flange of said cylindrical metal portion.

4. An engine mount as claimed in claim 3, further comprising a liquid chamber defining a main liquid chamber and an auxiliary liquid chamber.

5. An engine mount as claimed in claim 3, wherein said reinforcing metal fitting is formed as a single unit having a L-shape cross section, and said reinforcing metal fitting has a radial reinforcing portion that is opposed to the inner peripheral surface of said cylindrical metal fitting and an axial reinforcing portion that is opposed to the inner peripheral surface of said inwardly extending radial flange.

6. An engine mount as claimed in claim 5, further comprising a liquid chamber defining a main liquid chamber and an auxiliary liquid chamber.

7. An engine mount as claimed in claim 3, wherein said reinforcing metal fitting comprises an annular member having a L-shape cross section, and said reinforcing metal fitting has a radial reinforcing portion that is opposed to the inner peripheral surface of said inwardly extending radial flange, and an axial reinforcing portion that is opposed to the inner peripheral surface of said cylindrical metal portion.

* * * * *